March 2, 1943.  C. R. UNDERHILL  2,312,984
MOTOR DRIVEN LAWN MOWER AND WEED TOPPER
Filed Nov. 18, 1940  5 Sheets-Sheet 1
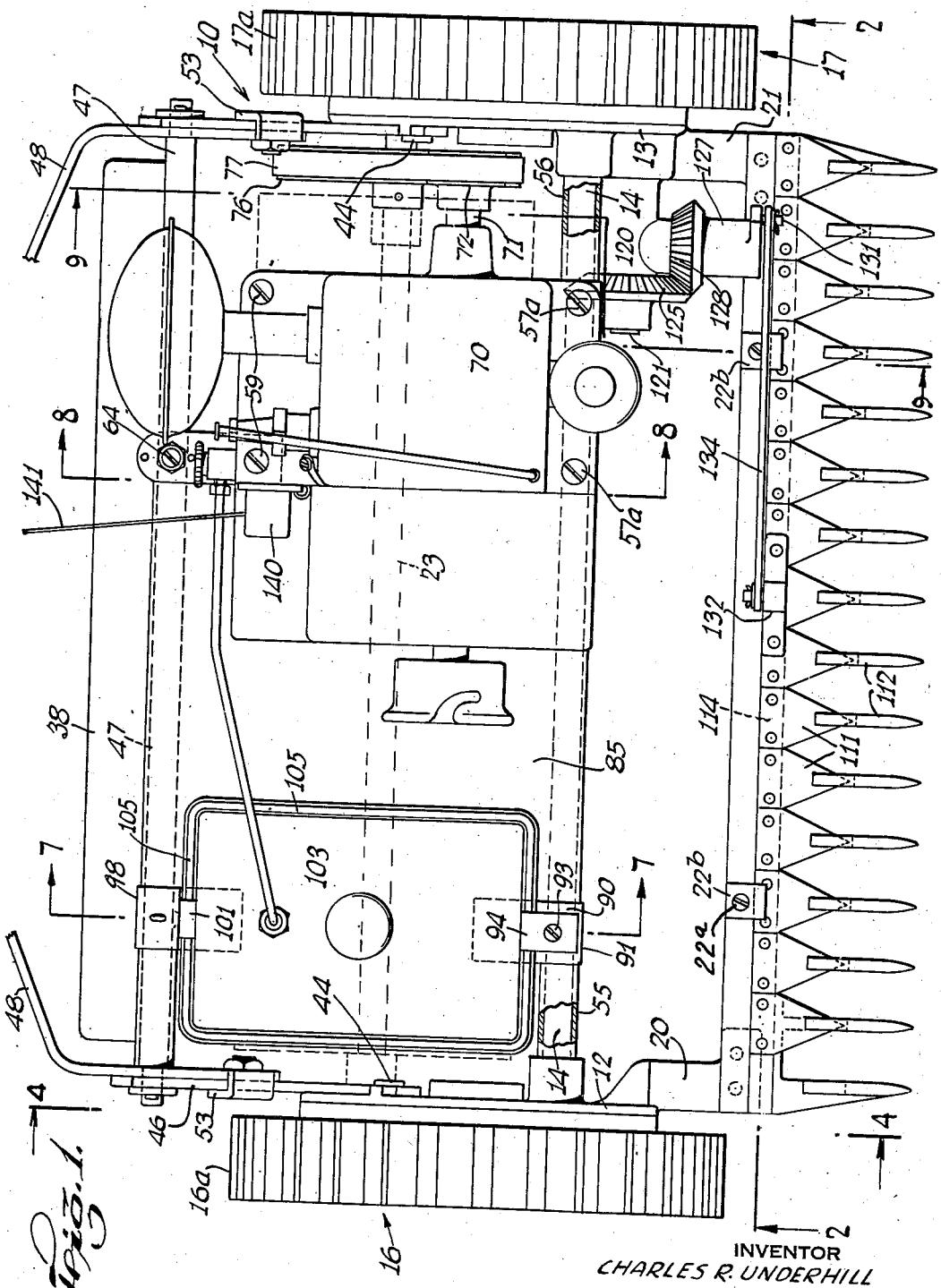
INVENTOR
CHARLES R. UNDERHILL
BY
Carl Miller
ATTORNEY

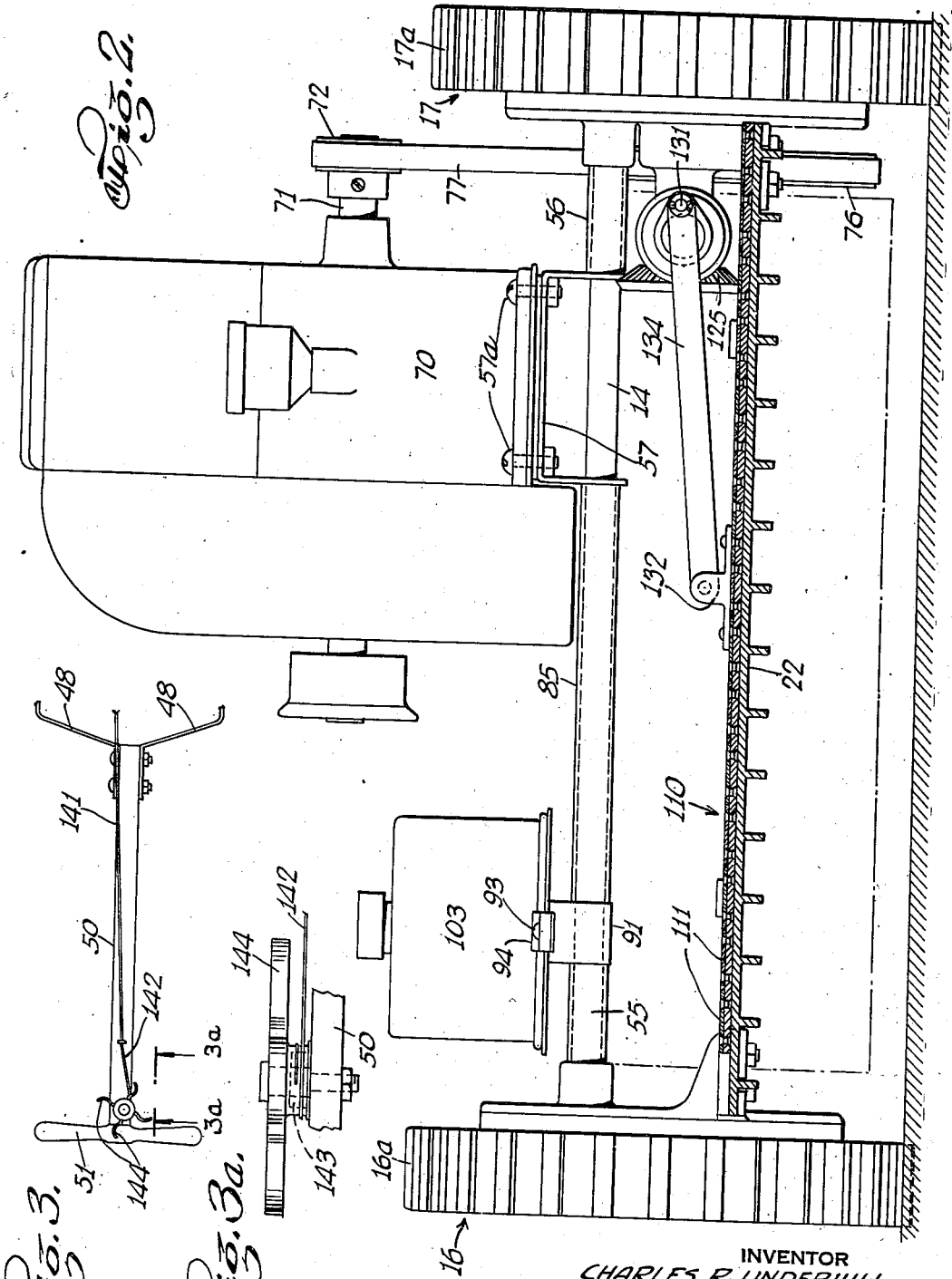

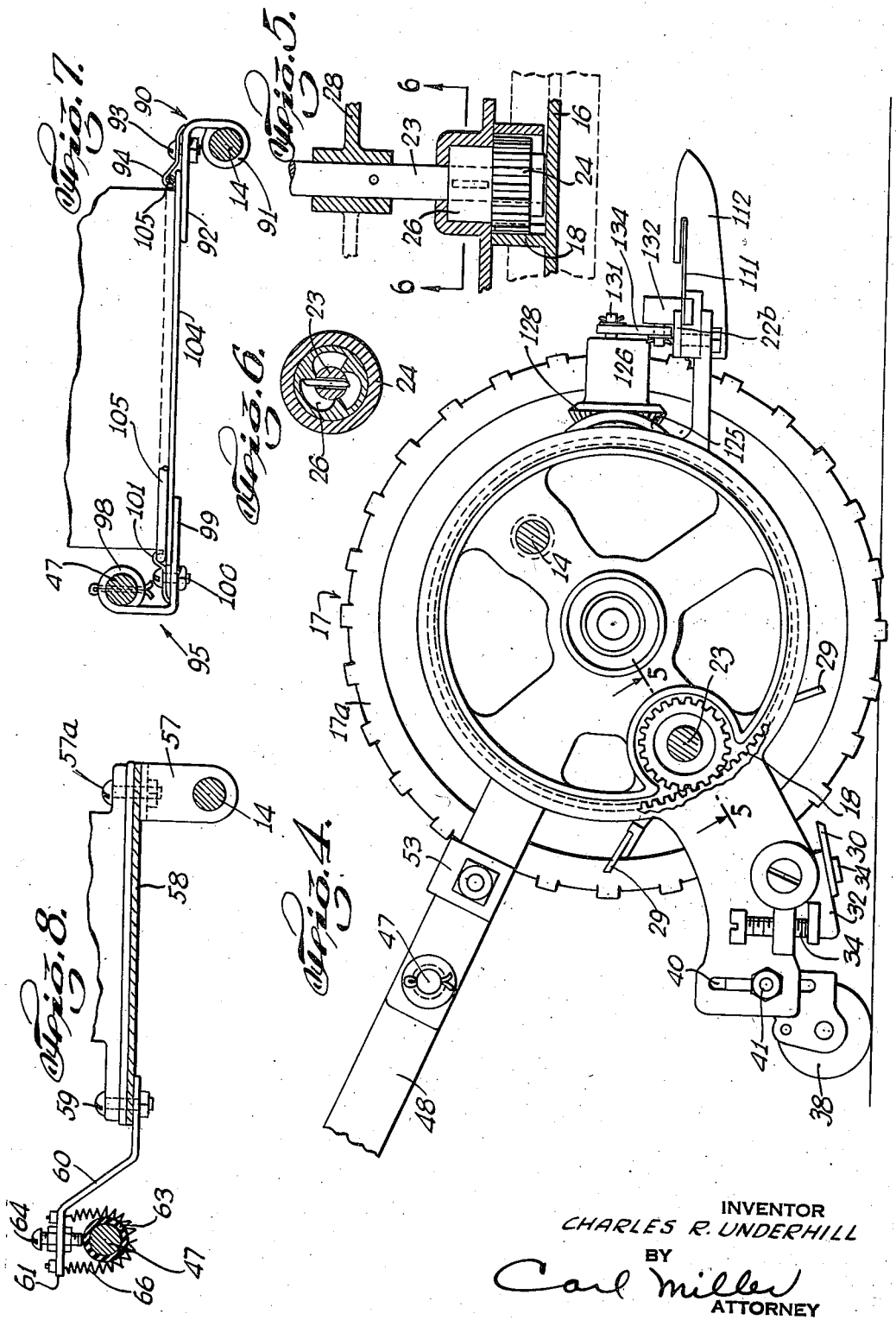

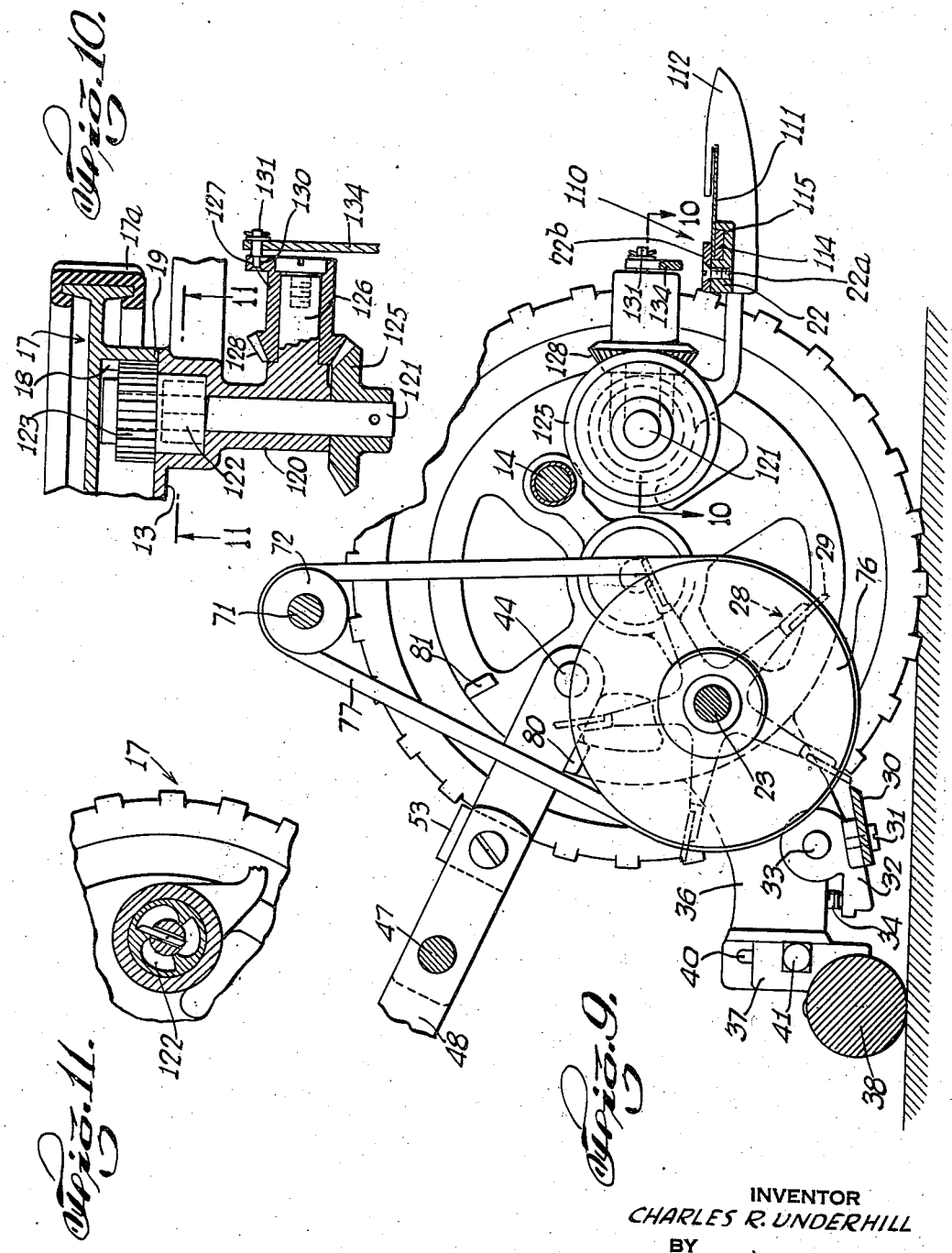

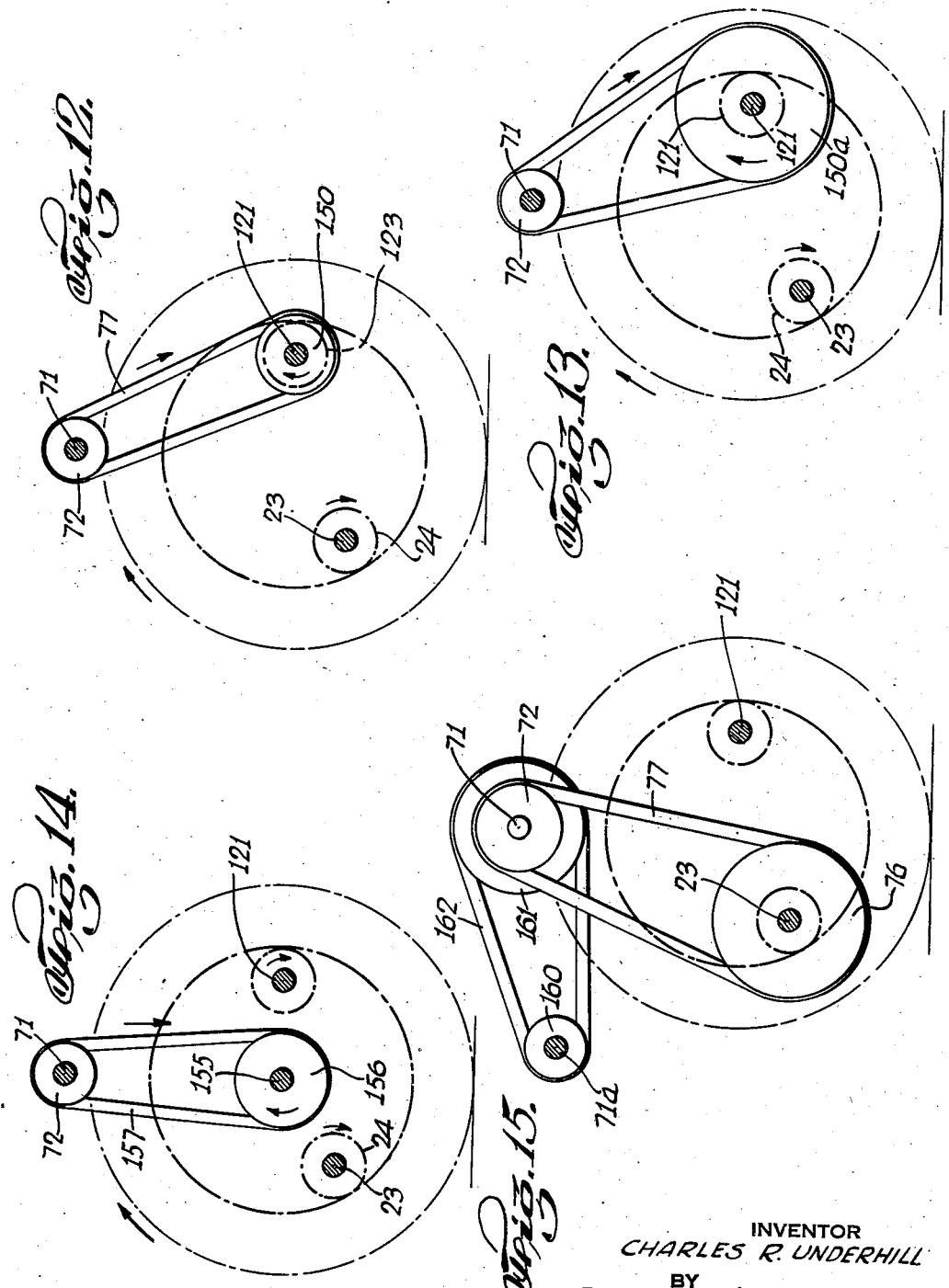

Patented Mar. 2, 1943

2,312,984

UNITED STATES PATENT OFFICE 2,312,984

MOTOR DRIVEN LAWN MOWER AND WEED TOPPER

Charles R. Underhill, Lower Bank, N. J.

Application November 18, 1940, Serial No. 366,155

6 Claims. (Cl. 56—25)

This invention relates to a motor driven lawn mower and weed topper. It is particularly directed to a motor driven lawn mower comprising a rotary blade cutter and a weed topping oscillatory cutting mechanism for general use on moderate and fairly large lawns.

An object of this invention is to provide a motor driven lawn mower and weed topper of the character described provided with a gasolene engine to rotate the traction wheels, operate the rotary cutting blade and to oscillate the weed cutter mechanism, the lawn mower being further provided with a ground engaging roller and being tiltable to position where it is supported on said roller, so that the lawn mower may be moved backward, and also to permit the motor to be started without the traction wheels engaging the ground.

A further object of this invention is to provide a device of the character described having a pair of ground engaging traction wheels provided with internal gears, the motor being connected through a speed reducing mechanism to a shaft on which are mounted the pinions meshing with said internal gears, said shaft carrying the cutter blades, and said device being provided with another pinion meshing with one of the internal gears for oscillating the weed cutter.

Yet a further object of this invention is to provide in a device of the character described, a rotary cutter shaft driven directly from the motor or engine and carrying pinions meshing with internal gears on the ground engaging traction wheels, the oscillatory weed cutter being driven by another internal gear on one of the traction wheels.

Yet a further object of this invention is to provide in a device of the character described, belt means to connect the motor with the rotary cutter shaft to permit temporary slippage of the belt in the event that the rotary cutter gets stuck, thus reducing shocks and strains on the respective cutters and associate mechanisms, and also to permit the cutter to be stopped to remove obstacles without stopping the motor, thus saving time and bother of restarting the motor.

Yet another object of this invention is to provide in a device of the character described, means adjacent the handle of the lawn mower to regulate the choke for the gasolene engine.

Yet a further object of this invention is to provide a device of the character described, which may be manually pushed forward by its steering handle when the motor is connected, but not running, and which may be manually pushed forward by its steering handle faster than the normal linear speed of said device while the motor is running.

Still another object of this invention is to provide a mower of the character described, which may be pulled backward either while the motor mechanism is running or with the power off by pressing down on the steering handle of said mower, so that the mower rests on a customary rear roller, whereby the mower may be permitted to run close to an obstruction and then be pulled backward.

Yet a further object of this invention is to provide a device of the character described, in which the transverse tie rod which holds together the side frames of the mower serves to support the fuel tank and engine, means being further provided to resiliently support the engine on said rod to take up strains, shocks and vibrations.

Still another object of this invention is to provide in a device of the character described, a steering handle pivoted to a transverse tie rod which is located rearwardly of the axis of the traction wheels, so that the steering handle may be held in any desired position, even standing vertically, and also to permit making turns close to buildings or fences, means being provided furthermore to limit rotation of the steering handle in opposite directions.

If the ground traction wheels were driven directly by the motor, the lawn mower could not be pushed forward by its steering handle when the motor is not running because of the compression in the cylinder of the engine, and the lawn mower could not be pulled backward by the steering handle with the ground traction wheels in contact with the ground when the motor is not running. However, by directly driving the rotary cutter shaft through the motor and driving the traction wheels through pinions on the cutter shaft clutch connected thereto, the mower can be pushed forward at any time, but the rotary cutter will not be operated when pushing the mower, if the motor is not running and the mower can be pulled backward by its steering handle with the mower resting on its tear roller and the oscillatory cutter can be manually operated by pushing on the steering handle when the motor is not running.

Yet another object of this invention is to provide a strong, rugged and compact device of the character described, which shall be relatively inexpensive to manufacture, cheap to operate, easy to handle, smooth and positive in operation, and practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown various possible illustrative embodiments of this invention, Fig. 1 is a top plan view of a combination lawn mower and top weed cutter embodying the invention;

Fig. 2 is a cross-sectional view taken on line 2—2 of Fig. 1;

Fig. 3 is a top plan view of the steering handle and motor control;

Fig. 3a is an enlarged view taken on line 3a—3a of Fig. 3;

Fig. 4 is a cross-sectional view taken on line 4—4 of Fig. 1;

Fig. 5 is a cross-sectional view taken on line 5—5 of Fig. 4;

Fig. 6 is a cross-sectional view taken on line 6—6 of Fig. 5;

Fig. 7 is a cross-sectional view taken on line 7—7 of Fig. 1;

Fig. 8 is a cross-sectional view taken on line 8—8 of Fig. 1;

Fig. 9 is a cross-sectional view taken on line 9—9 of Fig. 1;

Fig. 10 is a cross-sectional view taken on line 10—10 of Fig. 9;

Fig. 11 is a cross-sectional view taken on line 11—11 of Fig. 10;

Fig. 12 is a diagrammatic view illustrating the method of driving the cutter shaft and traction wheels from the motor shaft, and illustrating a modified form of the invention;

Fig. 13 is a view similar to Fig. 12, and illustrating a further modified construction;

Fig. 14 is a view similar to Fig. 12, and illustrating still another form of the invention; and Fig. 15 is a view similar to Fig. 12, and illustrating yet another form of drive, embodying the invention.

Referring now in detail to the drawings, 10 designates a motor driven combination lawn mower and top weed cutter embodying the invention. The same comprises a pair of similar, symmetrically disposed, side frames 12 and 13, interconnected by a transverse tie rod 14. The frames 12 and 13 are circular, and rotatably mounted thereon, are traction wheels 16 and 17 carrying annular internal gears 18 and 19. The wheels 16 and 17 carry treads 16a and 17a adapted to engage the ground. Extending forwardly from the side frames 12 and 13, are brackets 20 and 21 interconnected by a transverse ribbed plate 22, parallel to the tie rod 14.

Journalled on and between the side frames 12 and 13, is a transverse shaft 23. Rotatably mounted on the ends of shaft 23, are pinions 24 meshing with the internal gears 18 and 19 and connected to said shaft by one way clutches 26.

Mounted on the shaft 23 is a rotary blade grass cutter 28, carrying the usual curved plates 29 operating against platen cutter 30, fixed as at 31, to brackets 32 rotatably mounted on the frame, as on pins 33. Brackets 32 may be held against rotation in adjusted position by screw stops 34, in the well known manner.

Extending rearwardly from the side frames 12 and 13, and integrally formed therewith, are symmetrical brackets 36, on which are adjustably mounted for vertical movement, sliding brackets 37 carrying therebetween a rear wooden roller 38. Brackets 36 are formed with vertical slots 40, and brackets 37 are provided with bolts 41 passing through the slots 40 to fix the axis of the roller in various adjusted positions.

Pivoted as at 44, to the inner sides of the frames 12 and 13, are metal bars 46 interconnected by a transverse tie rod 47, parallel to the tie rod 14. Interconnecting the outer ends of the bar 46, by pivotal connections, are strap members 48, to which the steering post 50 is attached. At the outer end of the steering post is fixed a transverse handle 51.

The straps 48 may be pivotally attached to the bars 46 in various adjusted positions. Motion of straps 48 are limited by brackets 53. Mounted on the tie rod 14 are spacer sleeves 55 and 56. Mounted on said tie rod, adjacent the spacer sleeve 56, in a U-shaped bracket 57. Bolted to the top of the U-shaped bracket 57, as at 57a, is the base 58 of the engine 70. Bolted to the rear end of the base 58, as by bolts 59, is an offset bracket 60 having a portion 61 disposed above the tie rod 47. On tie rod 47 is a rubber sleeve 63 disposed below portion 61 of bracket 60. Screwed to said portion 61 of said bracket, is a vertical screw 64, the lower end of which contacts the rubber sleeve 63. Connected to said portion 61 of said bracket, are the outer ends of a coil tension spring 66 which passes beneath the tie rod. The screw 64 adjusts the tension of belt spring 66.

The gasolene engine 70 has a driven shaft 71 carrying a pulley 72. On shaft 23 is a pulley 76 of larger diameter than pulley 72. The pulleys 76 and 72 are interconnected by a belt 77.

It will now be understood that the motor drives pulley 72 which hence drives the shaft 23 through the pulley 76 to rotate the rotary blade cutter 28. Shaft 23, furthermore, rotates the traction wheels through the clutches 26, pinions 24 and internal gears 18 and 19. When the motor is not running, the lawn mower may be pushed forwardly. Said traction wheels can rotate even when the motor is not running by reason of the clutch mechanisms 26.

To pull the lawn mower back, the steering handle is pushed downwardly against suitable stops 80 on the side frames 12 and 13, to tilt the lawn mower about the rear roller 38. Upon moving the steering handle towards vertical position, the latter revolves about rod 47. Stops 81 are supplementary stops, unnecessary when the belt 77 is normally tight.

Interconnecting the tie rods 14 and 47, is a pan 85 disposed between bracket 57 and spacer 55. Said pan has rolled sheet metal at its outer ends rolled around the tie rods 14 and 47. Between the spacer 55 and the pan 85, is a bracket 90 having a portion 91 rolled around the tie rod 14, and a rearwardly extending portion 92. Bolted to portion 92, by bolt 93, is a clip 94, for the purpose hereinafter appearing.

Mounted on the rear tie rod 47, and aligned with bracket 90, is another bracket 95 having a rolled portion 98 surrounding said tie rod, and a forwardly extending horizontal portion 99 aligned with portion 92 of bracket 90. Bolted to portion 99 of bracket 95, as by bolt 100, is a clip 101. Mounted on the portions 92 and 99 of brackets 90 and 95, is a fuel tank 103 having an outwardly extending rolled edge 104 at its lower end. On said rolled edge 104, is a wire rod 105 surrounding the tank and engaged by the clips 94 and 101. The fuel tank is thus supported on the brackets 90 and 95.

Slidably mounted on the plate 22 is a weed cutter 110 having inclined V-shaped blades 111. Forwardly extending parallel prongs 112 are cast integrally with plate 22. The blades 111 are attached to a bar 114 slidably mounted in a groove 115 in the supporting plate 22. The blades 111 coact with portions of the prongs 112 to cut the weeds. Fixed to the plate 22, as by screws 22a, are two guide plates 22b overlapping the cutter 110 to retain the bar 114 within the groove 115.

Means is provided to oscillate the cutter 110 when the lawn mower moves forwardly either with the motor on or off. To this end, side frame 13 is provided with a bearing 120, in which is journalled a shaft 121. Mounted on said shaft and connected thereto, by clutch 122, is a pinion 123 meshing with the internal gear 19. On the shaft 121 is a bevel gear 125. Extending from the bearing 120 is a stud shaft 126, disposed at right angles to the shaft 121, and rotatably mounted thereon, is a sleeve 127 carrying a bevel gear 128 meshing with the bevel gear 125. Sleeve 127 is provided with an offset arm 130 carrying a pin 131. Interconnecting the pin 131 with a bracket 132 fixed to the cutter 110, is a connecting rod 134.

It will now be understood that when the traction wheels rotate, the pinion 123 is rotated to push shaft 121, bevel gear 125, and bevel gear 128, causing oscillation of the connecting rod 134 and hence reciprocation of the cutter 110.

The engine 70 is provided with a usual choke 140, to which there is connected an operating rod 141 extending lengthwise of the steering handle post 50. Attached to the outer end of the rod 141, is a cable 142, one end of which is wound on a winch 143. The winch is formed with a plurality of outwardly extending finger engaging arms 144. The winch is located near the handle 51, so that the operator may turn the winch to pull on the cable 142 and regulate the choke, whereby to control the engine. The winch 143 is provided with a spiral spring which normally takes up the slack of cable 142.

Referring now to Fig. 12, there is shown a machine similar to the machine, 10, with the exception that the engine shaft 71 is connected by the belt 77 to a pulley 150 on the shaft 121. With this construction, the drive is from the engine shaft through shaft 121 which turns the traction wheels, and said traction wheels in turn rotate the pinions 24 to operate the rotary blade cutter. Thus, one traction wheel is driven directly, and the other indirectly. Furthermore, in Fig. 12, the pulley 150 is somewhat greater than the pulley 72 on the engine shaft.

In Fig. 13, the structure is similar to Fig. 12, with the exception that pulley 150a replaces pulley 150 and is of larger diameter.

In Fig. 14, the traction wheels are interconnected by a central shaft 155, on which is mounted a pulley 156 connected through belt 157 to the pulley 72 on engine shaft 71. Rotation of the traction wheels causes rotation of the pinions 24 and 123.

In Fig. 15 the motor shaft is designated by numeral 71a, and is spaced from and parallel to shaft 71. On said shafts are pulleys 160 and 161 interconnected by a belt 162. On shaft 71 is a second pulley 72 connected by belt 77 to a pulley 76 on the cutter shaft 23. Otherwise, the structure is similar to the device 10.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. A device of the character described comprising a pair of annular coaxial frames, a handle pivoted thereto, a member on said handle parallel to the axis of said frames, a tie rod interconnecting said frames, a pair of traction wheels rotatably mounted on said frames, internal gears on said traction wheels and rotatable therewith, a transverse shaft parallel to the axis of said frames and spaced therefrom, a pair of pinions meshing with said internal gears, said pinions being journalled on the ends of said shaft and connected to said shaft by one-way clutches, a motor pivoted on said tie rod and resiliently attached to said member, and means interconnecting said shaft and motor to rotate said shaft when the motor is running, and blade cutters on said shaft and rotatable therewith.

2. A device of the character described comprising a pair of annular coaxial frames, a tie rod interconnecting said frames, a pair of traction wheels rotatably mounted on said frames, internal gears on said traction wheels and rotatable therewith, a transverse shaft parallel to the axis of said frames and spaced therefrom, a pair of pinions meshing with said internal gears, said pinions being journalled on the ends of said shaft and connected to said shaft by clutches, a motor supported on said tie rod, and means interconnecting said shaft and motor to rotate said shaft when the motor is running, blade cutters on said shaft and rotatable therewith, an additional pinion meshing with one of the internal gears, a shaft rotatably mounted on one of the frames, means interconnecting said last mentioned shaft with said last mentioned pinion, and a top weed cutter supported on said frames, and means connected to said last mentioned shaft to oscillate said top weed cutter.

3. A device of the character described comprising a pair of annular frames, a tie rod interconnecting said frames, a pair of traction wheels rotatably mounted on said frames, internal gears on said traction wheels, a pair of pinions meshing with said internal gears, said pinions being journalled on the ends of a transverse shaft parallel to said tie rod and connected to said shaft by one-way clutches, a steering handle pivoted to said frames, a transverse rod on said handle, parallel to said first rod, a support pivoted to said first rod, resilient means connecting said support to said second rod, a motor mounted on said support, and means interconnecting said shaft and motor to rotate said shaft when the motor is running, blade cutters on said shaft, and means on the steering handle to control said motor.

4. A device of the character described comprising a frame, traction wheels rotatably mounted thereon, a rotary blade cutter mounted thereon, a motor on said frame, means on the motor to drive said rotary blade cutter, and means including a clutch mechanism to drive said traction wheels when said rotary blade cutter is rotated, a top weed cutter, and means including a clutch mechanism to drive said weed cutter from said traction wheels.

5. A device of the character described comprising a frame, traction wheels rotatably mounted thereon, a rotary blade cutter mounted thereon, a motor on said frame, means on the motor to drive said rotary blade cutter, clutch means connecting said blade cutter to said traction wheels, to drive said traction wheels when said rotary blade cutter is rotated and permitting said traction wheels to rotate when the cutter blades are not being rotated by said motor, a reciprocating top weed cutter on said frame, and clutch means interconnecting said traction wheels to said top weed cutter to reciprocate said top weed cutter upon rotating said traction wheels and permitting said traction wheels to be rolled rearwardly without operating said top weed cutter.

6. A device of the character described, comprising a pair of co-axial frames, means to interconnect said frames, a pair of traction wheels rotatably mounted on said frames and disposed co-axially therewith, internal gears on said traction wheels, likewise co-axial with said wheels and rotatable therewith, a transverse shaft parallel to the axis of said frames and wheels, and spaced therefrom, a pair of pinions meshing with said internal gears, said pinions being journalled on the ends of said shaft and connected to said shaft by clutches, a motor supported on said frame, means interconnecting the motor to the shaft to rotate said shaft when the motor is running, blade cutters on said shaft and rotatable therewith, an additional pinion meshing with one of said internal gears, a shaft on said pinion, a top weed cutter supported by said frames, and means connected to the last shaft to oscillate said top weed cutter.

CHARLES R. UNDERHILL.